United States Patent [19]

Sakurai

[11] Patent Number: 5,592,583
[45] Date of Patent: Jan. 7, 1997

[54] VOICE OUTPUT DEVICE FOR OUTPUTTING VOCAL INSTRUCTIONS WHEN THE WAITING TIME FOR A KEY INPUT OPERATION EXCEEDS A SET TIME LIMIT

[75] Inventor: Atsushi Sakurai, Yokohama, Japan

[73] Assignee: Canon Kabushiki Kaisha, Tokyo, Japan

[21] Appl. No.: 88,110

[22] Filed: Jul. 9, 1993

Related U.S. Application Data

[63] Continuation of Ser. No. 815,884, Jan. 7, 1992, abandoned, which is a continuation of Ser. No. 350,445, May 11, 1989, abandoned.

[30] Foreign Application Priority Data

May 12, 1988 [JP] Japan ................................. 63-113563

[51] Int. Cl.$^6$ ............................. G01L 1/06; G06F 15/00; G10L 5/02; G10L 9/00
[52] U.S. Cl. ....................... 395/2.09; 395/2.76; 395/2.79; 395/2.91
[58] Field of Search ............................. 381/51–53; 395/2, 395/707, 709.09

[56] References Cited

U.S. PATENT DOCUMENTS

| | | | |
|---|---|---|---|
| 4,387,269 | 6/1983 | Hashimoto et al. | 395/2.76 |
| 4,420,813 | 12/1983 | Inoue et al. | 395/2.79 |
| 4,423,290 | 12/1983 | Yoshida et al. | 381/51 |
| 4,426,733 | 1/1984 | Brenig | 455/79 |
| 4,465,003 | 8/1984 | Makabe et al. | 112/445 |
| 4,497,032 | 1/1985 | Shinohara | 395/2.79 |
| 4,513,189 | 4/1985 | Ueda et al. | 395/2 |
| 4,520,576 | 6/1985 | Molen | 395/2 |
| 4,598,367 | 7/1986 | DeFrancesco et al. | 364/408 |
| 4,706,288 | 11/1987 | Hashimoto | 381/51 |
| 4,776,016 | 10/1988 | Hansen | 381/42 |

FOREIGN PATENT DOCUMENTS 2050979  1/1981  United Kingdom.

*Primary Examiner*—Ayaz R. Sheikh
*Assistant Examiner*—Indranil Chowdhury
*Attorney, Agent, or Firm*—Fitzpatrick, Cella, Harper & Scinto

[57] ABSTRACT

A voice output device includes a processor for setting a time limit for waiting for the performing of a key input operation. The device also includes a timer for measuring a waiting time for the performing of a key input operation to detect the lapse of the time limit. The device further includes voice processing circuitry for outputting voice instructions to the operator when the lapse of the time limit is detected by the timer.

34 Claims, 7 Drawing Sheets

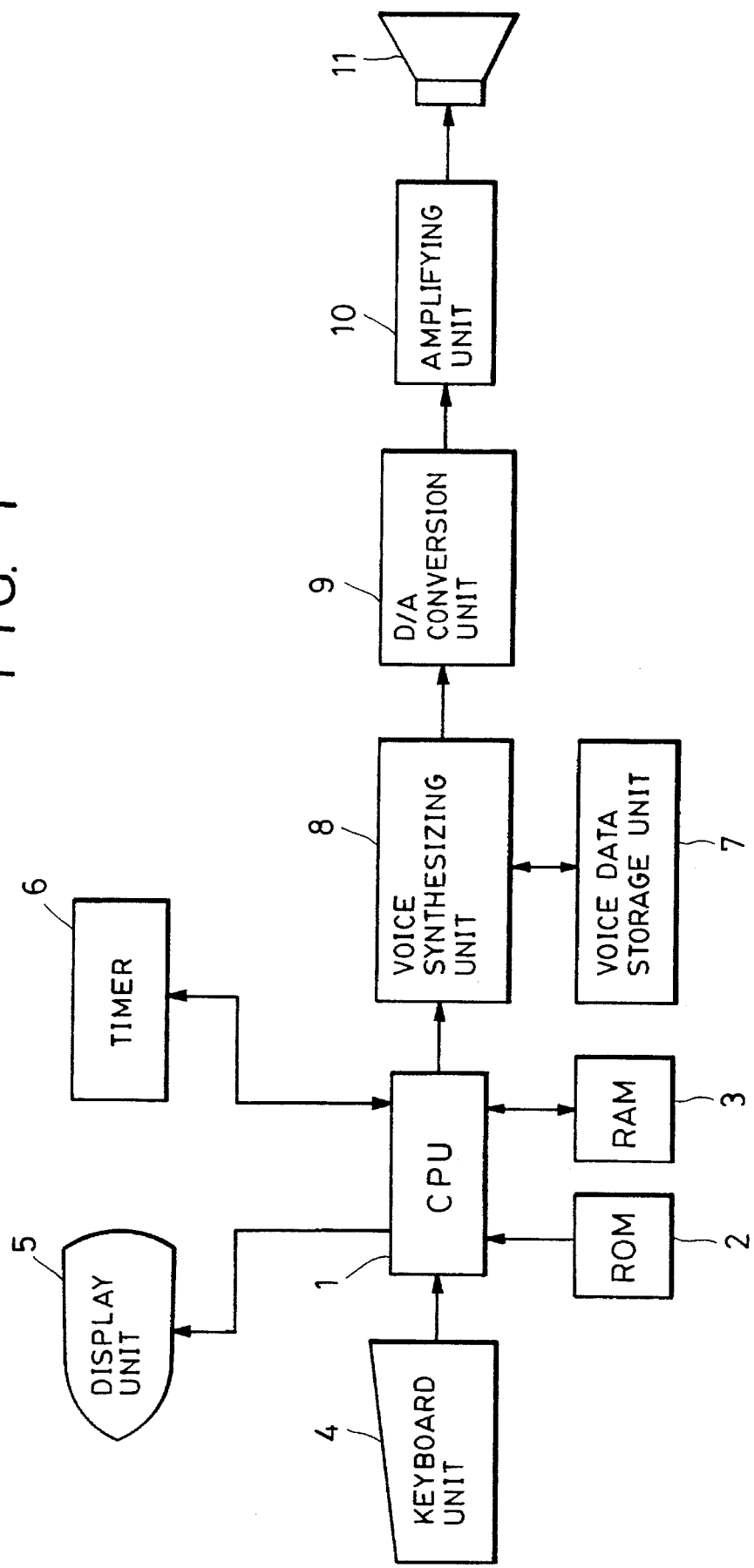

FIG. 3

| ADDRESS | VOICE DATA |
|---|---|
| 001 | INPUT PRODUCT CODE |
| 002 | INPUT QUANTITY |
| 003 | INPUT SUM |
| 007 | CONFIRM THE RESULT OF CALCULATION |

FIG. 4

| VARIABLE | DATA |
|---|---|
| i ; NUMBER OF VOICE INSTRUCTION | — |
| N ; TOTAL NUMBER OF VOICE INSTRUCTIONS | 7 |
| t ; TIME LIMIT | 30 |

FIG. 5

INTEGER t
   DATA   t /30/
   DATA   N /7/

FIG. 6

| VARIABLE | DATA |
|---|---|
| i'; NUMBER OF VOICE INSTRUCTION | — |
| N'; TOTAL NUMBER OF VOICE INSTRUCTIONS | 7 |
| t(1); TIME LIMIT FOR INSTRUCTION NO. 1 | 30 |
| t(2); TIME LIMIT FOR INSTRUCTION NO. 2 | 30 |
| t(3); TIME LIMIT FOR INSTRUCTION NO. 3 | 30 |
| t(7); TIME LIMIT FOR INSTRUCTION NO. 7 | 10 |

FIG. 7
```
INTEGER  t(7)
 DATA     t / 30 , 30 , 30 , 30 , 30 , 30 , 10 /
 DATA     N / 7 /
```
FIG. 8A
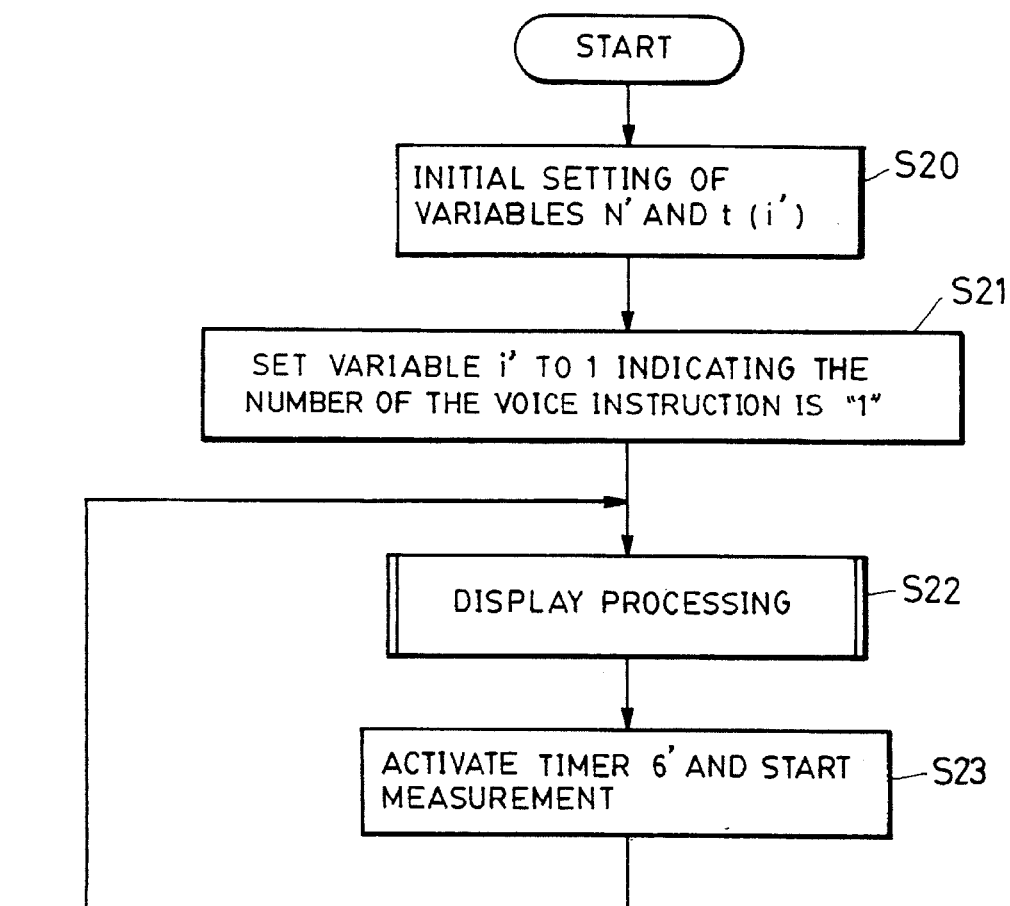
FIG. 8
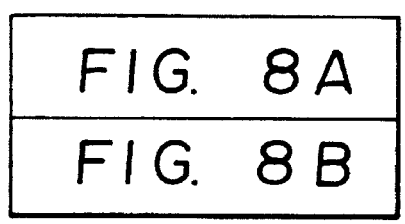

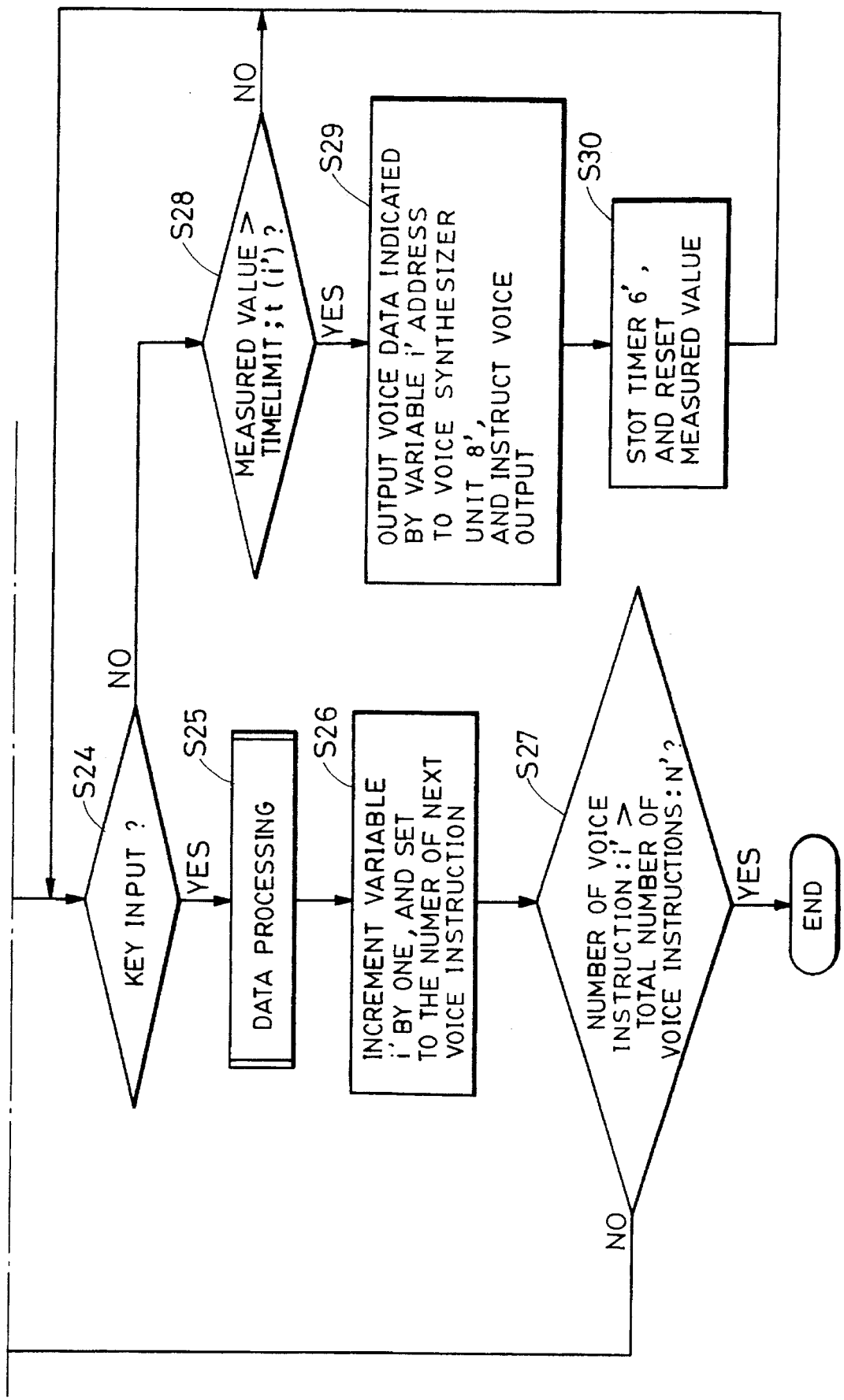

10,000 ft

VOICE OUTPUT DEVICE FOR OUTPUTTING VOCAL INSTRUCTIONS WHEN THE WAITING TIME FOR A KEY INPUT OPERATION EXCEEDS A SET TIME LIMIT

This application is a continuation of application Ser. No. 07/815,884 filed Jan. 7, 1992, now abandoned, which is a continuation of application Ser. No. 07/350,445 filed May 11, 1989, now abandoned.

BACKGROUND OF THE INVENTION

1. Field of the Invention

This invention relates to an electronic device, and more particularly, to an electronic device which outputs voice instructions in an electronic apparatus, such as an office computer, a personal computer, a facsimile device or the like.

2. Description of the Related Art

Heretofore, this kind of electronic apparatus has assisted a user who is unfamiliar with key input operations and the like by outputting voice instructions. This approach utilizes the feature of vocal instructions in order that information can be simply transmitted to any person.

In the above-described apparatus, however, the instructions become unnecessary once the user becomes skilled in operating the apparatus, and the vocal instructions which are output at every operation hinder the operation of the apparatus. Hence, apparatus have newly been devised such that, when there is some kind of request for stopping the voice output of the apparatus to the user, the outputting of vocal instructions stops. However, this approach is not an effective means of overcoming the problem, since vocal instructions are output at the first operation of the apparatus by the user.

SUMMARY OF THE INVENTION

The present invention has been developed to solve the problems of the prior art.

It is an object of the present invention to provide a voice output device for outputting instructions by means of voice which are appropriate, for example, for a user who is unfamiliar with or skilled in the operations of an apparatus, by outputting vocal instructions only when an operation is not performed within a predetermined time interval.

It is another object of the present invention to solve the problems of the prior art.

It is a further object of the present invention to provide an improved electronic device which provides vocal instructions to the operator.

The invention which achieves these objectives, according to one aspect, relates to a voice output device comprising setting means for setting a time limit for waiting for the performing of a key input operation, a timer for measuring a waiting time of a key input operation to detect the lapse of the time limit, and voice output means for outputting voice instructions when the lapse of the time limit is detected by the timer. The setting means can comprise means for independently setting the time limit for each kind of key input operation. The setting means may be a processor, and more specifically, a central processing unit. In addition, the voice output means can comprise voice processing circuitry, and more specifically, a voice synthesizing unit, a digital to analog conversion unit, an amplifying unit, and a speaker.

According to another aspect, the present invention relates to a device comprising storage means for storing information comprising a plurality of vocal messages to be output and information on the waiting time limit for the performing of a key input associated with each message, measuring means for measuring the time for waiting for the performing of a key input associated with each message, and detection means for detecting the lapse of the waiting time limit, according to the measurement made by the measuring means. The measuring means starts to measure the time for waiting for the performing of a key input associated with each message before the waiting time limit detected by the detection means lapses. The device can further comprise output means for outputting the plurality of messages to be output, when the lapse of the waiting time limit has been detected by the detection means. The storage means can comprise two storage means, one for storing the plurality of messages and the other for storing the information on the waiting time associated with each message, More specifically, the storage means can comprise a random access memory for storing the information on the waiting time associated with each message, and a voice data storage unit for storing the plurality or messages. Further, the measuring means can comprise a timer and the detection means can comprise a central processing unit.

According to another aspect, the present invention relates to a device comprising a processor for setting a time limit for waiting for the performing of a key input operation, a timer for measuring a waiting time for the performing of a key input operation to detect the lapse of the time limit, and audio processing circuitry for outputting audio instructions to the operator when the lapse of the time limit is detected by the timer. The processor can be a central processing unit and the audio processing circuitry can comprise voice processing circuitry for outputting voice instructions to the operator when the lapse of the time limit is detected by the timer. The voice processing circuitry can comprise a voice synthesizing unit, and a speaker. The processor can independently set the time limit for a plurality of kinds of key input operations.

According to another aspect, the present invention relates to a device comprising a memory device, a timer, and detecting circuitry. The memory device stores a plurality of vocal messages to be output and stores information on the waiting time limit for the performing of a key input operation associated with each message. The timer measures the time for waiting for the performing of a key input operation associated with each message. The detecting circuitry detects the lapse of the waiting time limit in accordance with the measuring performed by the timer. The timer starts to measure the time for waiting for the performing of a key input operation associated with each message before the waiting time limit detected by the detecting circuitry lapses. The memory device can comprise a random access memory storing the information on the waiting time limit associated with each message and a voice data storage unit storing the plurality of messages. The detecting circuitry can comprise a processor, and the processor can comprise a central processing unit.

BRIEF DESCRIPTION OF THE DRAWINGS

FIG. 1 is a schematic block diagram showing a personal computer (abbreviated hereinafter as PC) having a voice output function according to a first embodiment of the invention;

FIG. 3 is a diagram showing a voice data table of the first embodiment;

FIG. 4 is a diagram showing a variable data table according to the first embodiment;

FIG. 5 is a diagram showing a method of setting variables according to the first embodiment;

FIG. 6 is a diagram showing a variable data table according to a second embodiment;

FIG. 7 is a diagram showing a method of setting variables according to the second embodiment; and FIG. 8 is a flowchart showing a method of outputting vocal instructions according to the second embodiment, wherein FIG. 8 comprises FIGS. 8A and 8B, such that FIG. 8B is a continuation of the flowchart shown in FIG. 8A.

DESCRIPTION OF THE PREFERRED EMBODIMENTS

Figure 2A:
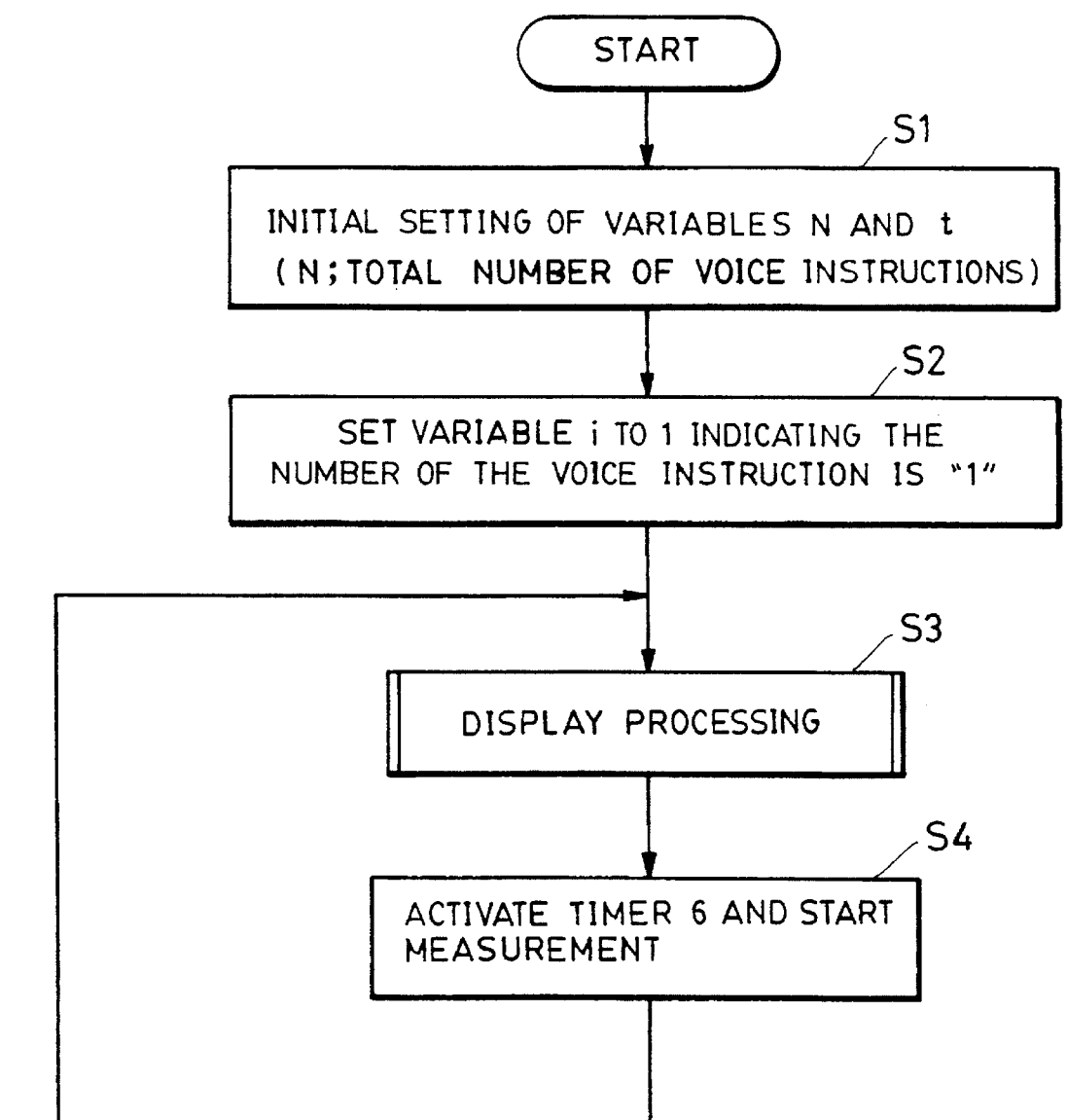
FIGS. 2A and 2B illustrate a flowchart of a method of outputting vocal instructions in the first embodiment such that FIG. 2B is a continuation of the flowchart shown in FIG. 2A.

The preferred embodiments of the present invention will be hereinafter explained in detail with reference to the accompanying drawings.

FIG. 1 is a schematic block diagram showing a personal computer (abbreviated hereinafter as "PC") having a voice output function according to the first embodiment of the present invention. The voice output device of the present invention may be applied either in the form of the voice output device itself, or to an apparatus in which the device is incorporated, or to a system comprising plural apparatus. In FIG. 1, a CPU 1 controls the entire apparatus. A ROM (read only memory) 2 stores a control program, an error handling program, a program in accordance with the flow chart shown in FIG. 2 which will be described later, a program in accordance with the flow chart shown in FIG. 5 which will be described later, and the like. A RAM 3 (random access memory) comprises working areas for various kinds of programs and temporary standby areas for error handlings. In the RAM 3, a variable data table 101 shown in FIG. 4, which will be described later, is stored.

A keyboard unit 4 has various keys which a general PC has for inputting data and commands. A display unit 5 displays the operation status of the apparatus for the operator, character and figure information, the result of calculations and the like. A timer 6 measures a lapse time from a start instruction or halt instruction of the CPU 1. A voice data storage unit 7 stores a voice data table 100 shown in FIG. 3 which will be described later. Thus, the apparatus includes a storage device or memory comprising RAM 3 (for storing information on the waiting time for performing a key input associated with each message in voice data table 100, as will be described later) and the voice data storage unit 7 (for storing data corresponding to a plurality of messages or instructions, as will also be discussed later). Audio or voice processing circuitry, comprising elements 8–11 described below, is also provided. A voice synthesizing unit 8 sequentially reads out voice data from the voice data storage unit 7 in response to an instruction of the CPU 1 to synthesize a voice instruction. A digital/analog (abbreviated hereinafter as "D/A") conversion unit 9 converts a voice digital signal input from the voice synthesizing unit 8 into an analog signal. An amplifying unit 10 amplifies analog signals output from the D/A conversion unit 9.

A speaker 11 outputs, vocally, analog signals amplified in the amplifying unit 10.

Now, the methods of registering and reading voice data will be explained with reference to FIGS. 3 through 5.

FIG. 3 is a diagram showing a voice data table of the first embodiment. In FIG. 3, a voice data table 100 provides a table of plural voice data. In the table, voice data consist of seven sequential voice instructions or message 1–7, which correspond to the operation procedures to be performed by the operator. For example, the first voice data, instruction number 1 are registered in address "1", and represents the phrase "input the product code". Voice data are thus sequentially registered up to voice data in address "7" which represents the phrase "confirm the result of the calculation". The address at which the voice data are registered is identical to the address give by CPU 1 to unit 8 when the CPU 1 instructs the voice synthesizing unit 8 to output a particular voice instruction. Accordingly, the voice synthesizing unit 8 reads voice data from the voice data storage unit 7 by outputting the address at which the voice data are registered to unit 7 based upon data input from the CPU 1.

FIG. 4 is a diagram showing a variable data table according to the first embodiment, and FIG. 5 is a diagram showing the method of setting variables according to the first embodiment, In FIG. 4, a variable data table provides a table of variables and the setting of values of the variables. The variable data table 101 is stored in the RAM 3, and can be freely read and written. In FIG. 4, the variable i represents the number assigned to a voice instruction which is given to the operator. The variable i also represents the address information of the voice data table 100 shown in FIG. 3. A variable N is a variable which indicates the total number of voice instructions which the present device uses. The variable t indicates a Lime limit for the operator to perform a key input, and if no key input is performed by the end of the time limit, a voice instruction is output. The data values in the variable data table 101 are values used in the present embodiment, and particularly, the variable i indicating the number of voice instructions is not specified.

Now, when an instruction for starting the processing of the present device is given by the operator, the CPU 1 sets the initial value of several variables. Specifically, the program for choosing the initial value of several variables shown in FIG. 5 is executed. The program language is FORTRAN. The specification statement INTEGER declares the variable t for the time limit as an integer variable. In statements DATA, a numerical value "30" is given to the variable t, and a numerical value "7" is given to the variable N which is the total number of voice instructions.

In the present embodiment, the variable t is "30" and the variable N is "7" as described above, and the unit of time of the time limit is one tenth of a second. Hence, the time from the operator performing a key input to the output of a voice instruction is 3.0 seconds. The value "7" indicates that voice instructions can be sequentially output up to seven times.

Next, the method of outputting a voice instruction according to the present embodiment will be explained with reference to FIG. 2.

Figure 2:
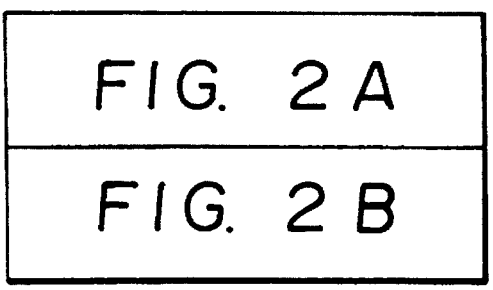
FIG. 2 illustrates the relationship between FIGS. 2A and 2B.
Figure 2B:
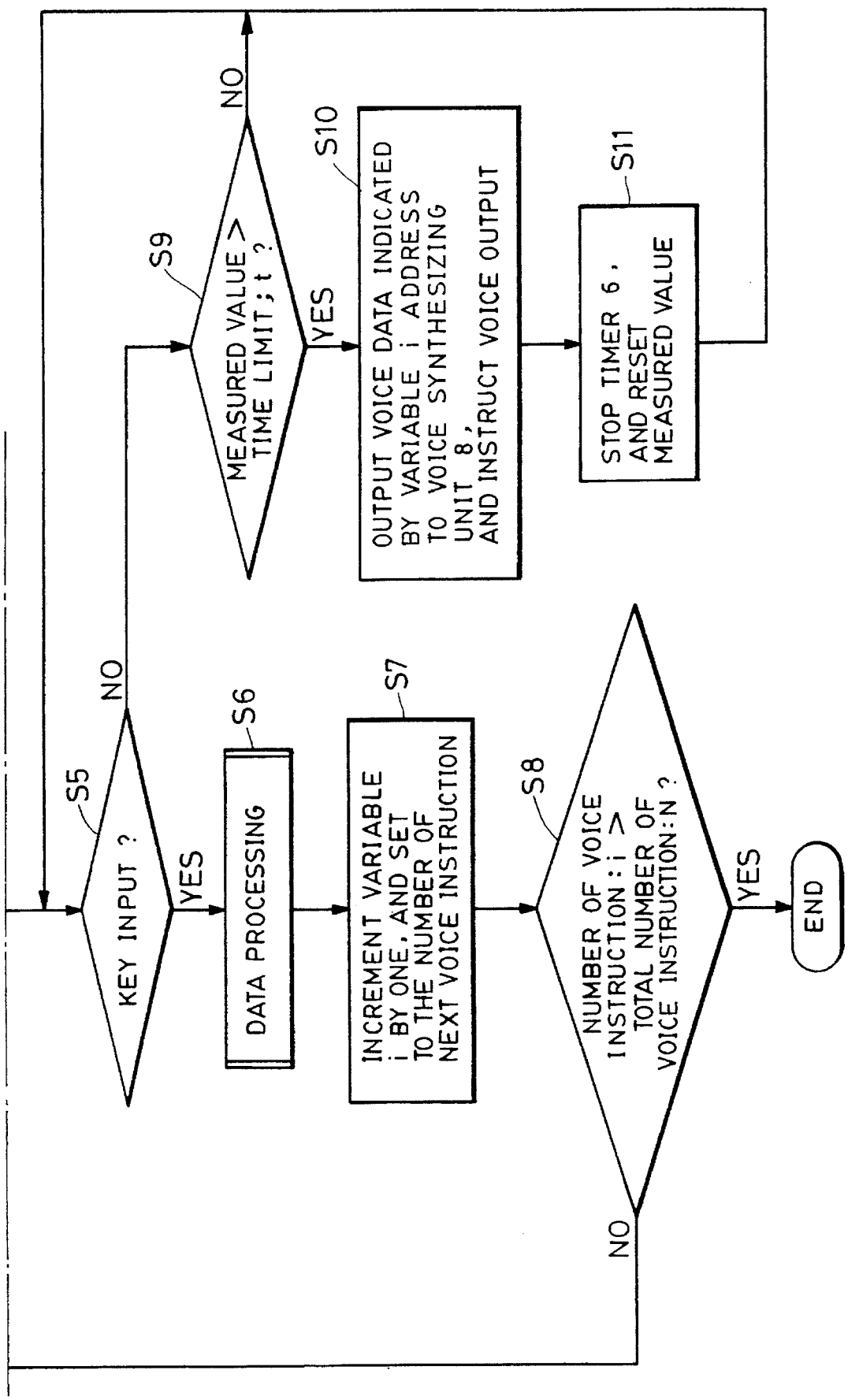

FIG. 2 is a flow chart showing the method of outputting a voice instruction according to the present embodiment.

First, initial values of variables are set according to the above-described program shown in FIG. 5 (step S1). An integer value "1" is then assigned to the variable i indicating that voice instruction number 1 is initially selected (step S2). After thus performing the initial setting of respective variables, display processing is performed in which the operator is notified of a key-input-waiting state using the display unit 5 (step S3). The display processing is performed by means of moving a cursor to a predetermined position on the picture surface of the display unit 5. The measurement of lapsed time is then started by activating the timer 6 (step S4).

The lapse time is measured in units of one tenth of a second in the timer 6. The occurrence of a key input from the keyboard unit 4 is then determined by CPU 1. If there is a key input, the usual data processing of data input from the operator is performed (steps S5 and S6). If there is no key input, the value of the number of units of lapsed time measured by the timer 6 is reviewed by CPU 1. If the value exceeds "30", which is the content of the variable t of the time limit, the CPU 1 determines or detects that the limit time is surpassed (step S9), and the content of the variable i, indicating the number of a voice instruction, is sent by the CPU 1 to the voice synthesizing unit 8 to instruct the output of voice data (step S10). The voice synthesizing unit 8 then determines the numerical value sent from the CPU 1, and reads out voice data stored at the corresponding address in the voice data table 100 in the voice data storage unit 7. The data are then sequentially transferred to the D/A conversion unit 9, amplifying unit 10 and speaker 11 to provide a vocal instruction. For example, since the variable i assumes the value "1", the voice data "input the product code", which are stored at address "001" in the voice data table 100, are output as a voice instruction.

After thus outputting the voice data to the voice synthesizing unit 8, the timer 6 is stopped and the measured value of the lapsed time is reset (step S11). The process again returns to step S5, where the occurrence of a key input is determined. Now, since the timer 6 is under the state of being kept stopped at step S11, the determination at step S9 becomes always "NO", and there is no output of a voice instruction at step S10. Accordingly, the processing steps of steps S5 and S9 are repealed until there is a key input. When a voice instruction at a certain address has been output, the same voice instruction is not repeatedly output, and the processing steps of steps S5 and S9 are also repeated until there is a key input.

When the time limit of 3.0 seconds has not been surpassed and the determination of no key input is performed at step S5 by CPU 1 while the timer 6 is being actuated, the determination is made by the CPU 1 at step S9 that the measured value does not exceed the content "30" of the variable t of the time limit, and the processing method again returns to step S5. Hence, a voice instruction corresponding to the address at this moment is not output while the time limit of 3.0 seconds is not exceeded, and the process assumes a state of waiting for a key input.

After a key input has been detected at step S5 by the CPU 1 and data processing of data input from the operator has been performed at step S6, the variable i is incremented by one, and the resultant next numerical value is assigned to the variable i thereby setting the next voice instruction (step S7). When the value of the variable i is, for example "1", which indicates the first key input operation has been performed, the value of the variable i becomes "2" by being incremented, thereby setting voice instruction number 2. The value of the variable i at this moment is then compared with the number "7" of the variable N, which represents the total number of voice instructions, and the CPU 1 determines whether or not the value of the variable i is larger than "7" (the variable N of the total number) (step S8). When the result of the determination is that the number (the variable i) is less than the total number (the variable N), the process again returns to step S3, where display processing is performed. Subsequently, the measurement is again started at step S4, and a key input from the operator is awaited, and steps S5 and S9 are repeated until the measured value of the timer 6 exceeds the time limit.

Every time the processing step of step S7 is performed, the variable i indicating the number of a voice instruction is thus incremented by one. Hence, when the processing step at step S10 is executed, the resultant voice instruction corresponds to the content stored in address "00i" within the voice data storage unit 7. When the value of the variable i indicating the number of a voice instruction becomes "8" as a result of the determination processing at step S8, the entire processing steps of the present embodiment are terminated. That is, in the present embodiment, the processing operation from step S3 to step S8 are repeated seven times.

As explained above, in the present embodiment, only when a key input is not detected even when a predetermined time limit has been surpassed, a voice instruction for input processing at that moment is output. Hence, it is possible to construct an electronic apparatus system which has good operationability and is appropriate for the degree of skill of the operator, and in which, by means of the proper setting of a time limit, voice instructions are output for a beginner, and voice instructions are not output for an expert from the beginning of use of the device if a key input is performed within a predetermined time limit.

Now, a second embodiment will be explained with reference to FIGS. 6 through 8.

In the second embodiment, a PC is provided in which a time limit for awaiting a key input in the first embodiment can be independently set for each voice instruction. This approach corresponds to the situation in which, when there are plural kinds of data to be input, the importance of a voice instruction differs in accordance with the kind and order of data. That is, it is an object of the second embodiment to shorten the time limit which must lapse before the outputting of an important voice instruction, and thus increase the probability of the voice instruction being output. Although the configuration of the second embodiment is basically identical to that of the first embodiment, programs and variables stored within the ROM 2 or RAM 3 shown in FIG. 1 differ. It is to be noted that, in the configuration of the second embodiment, primes "'" are attached to reference numbers which will not be illustrated because they refer to elements that are identical to corresponding elements without primes shown in FIGS. 1–5.

FIG. 6 is a diagram showing a variable data table in the second embodiment. In a variable data table 200 in the second embodiment, there are shown the variable i' indicating the number of a voice instruction, and the variable N', indicating, the total number of voice instructions. In the second embodiment, the value of the variable N' is also set to "7". The t (i'), that is, from t(1) to t(7) shown in FIG. 6, consists of seven variable time limits, which represent predetermined time limits for voice instructions No. 1 to No. 7, respectively. In a voice data table 100', voice data which are identical as those in the first embodiment are stored within a voice data storage unit 7'.

FIG. 7 is a diagram showing a method of setting the variables in the second embodiment. In FIG. 7, the language FORTRAN is also used, as in FIG. 5 described above. Limit t(i') for respective voice instructions has been declared as an integer array variable by specification statement INTEGER. Numerical values "30", "30", "30", "30", "30" and "10" are given to t(1), t(2), t(3), T(4), t(5), t(6), and t(7), respectively, by statement DATA. Since the unit of time is also made to be one tenth of a second in this embodiment, the time limit for respective voice instructions becomes 3.0 seconds except for instruction No. 7. The time limit for the voice instruction No. 7 becomes 1.0 second, and so the probability of this voice instruction being output under a state of awaiting a key input becomes high.

Now, the method of outputting a voice instruction according to the second embodiment will be explained.

FIG. 8 is a flow chart showing the method of outputting a voice instruction according to the second embodiment.

First, steps S20 and S28 are executed instead of steps S1 and S9 in the first embodiment, respectively. The operation will be hereinafter explained centering around differences from the first embodiment according to the flow chart in FIG. 8.

First, when an instruction for starting the processing method is given by the operator, the initial setting of the time limits and total number of voice instructions is performed according to the program in FIG. 7 (step S20). An integer value "1" is then assigned to the variable i' indicating that a voice instruction number 1 is initially selected (step S21). The processing then enters into a loop. When a key input is detected by the CPU 1 as in the first embodiment (step S24), processing of data input by the operator and the setting of the variable i' to the next voice instruction are then performed (steps S25 and S26). Step S27, identical to step S8 in the first embodiment is then performed and the process returns again to step S22 and the same instruction steps are repeated until voice instruction "7" is set, which is the value of the variable N set at step S20. When the value of a voice instruction, that is, the variable i', becomes "8", the entire processs is terminated.

When a key input is not detected by the CPU at step S24, the variable t(i') of time limit which corresponds to the number of a voice instruction at that moment is compared with the measured number of units of lapsed time by the timer 6'. When the measured value exceeds the time limit, output of the voice instruction, stopping of the timer 6' and resetting of the measured value are performed as in the first embodiment (steps S28–S30). The process then returns to step S24. The time limit for a key input is as long as 3.0 seconds for voice instructions Nos. 1 through 6, since their importance is not set high. On the other hand, the time limit for a key input is set at a short value of 1.0 second for voice instruction No. 7, since its importance is high.

In the output processing of voice instructions in the second embodiment, it is thus possible to independently set a time limit for awaiting a key input for every voice instruction. Hence, by setting short time limits for voice instructions having a high importance and setting longer time limits for voice instructions having a low importance, only voice instructions having a great importance have a high probability of being output for many operators, and other voice instructions are output in accordance with the degree of skill of the user. Consequently, it is possible to provide an excellent voice guidance function having higher operationability than that in the first embodiment from the viewpoint of flexibility.

Summing up the above-described two embodiments, by means of a proper setting of time limits with a simple configuration in which a timer is added, it is possible to provide voice instructions for a beginner, and, to provide for an expert, voice instructions which are output appropriately in accordance with the degree of skill of the operator, such that data or word processing can be terminated without voice instructions being output depending on the speed of the key inputs. Hence, the present invention can provide an excellent effect from the viewpoint of operationability.

Although a PC is used in the present embodiments, the invention is not limited thereto, but can also be applied to, for example, facsimiles and the like.

As explained above, according to the present invention, it is possible to provide an electronic device in which a vocal instruction is output in accordance with the degree of skill of the operator, that is, the lapse time until a key input is performed.

What is claimed is:

1. A voice output device comprising:
    a memory for storing data representing voice instructions relating to a sequence of key input operations;
    means for storing data representing a plurality of time limits associated with the voice instructions;
    means for setting a plurality of time limits associated with the voice instructions and for storing data representing the set time limits in said storing means;
    a timer for measuring a waiting time for a next key input operation of the sequence of key input operations;
    detection means for detecting whether the waiting time measured by said timer surpasses a stored time limit associated with a particular voice instruction; and
    voice output means for outputting the particular voice instruction relating to the next key input operation in response to a detection by said detection means that the waiting time for the next key input operation surpasses the time limit associated with the particular voice instruction.

2. A voice output device according to claim 1 wherein said detection means comprises a processor.

3. A voice output device according to claim 2 wherein said processor comprises a central processing unit.

4. A voice output device according to claim 1 wherein said voice output means comprises voice processing circuitry.

5. A voice output device according to claim 4 where said voice processing circuitry comprises:
    a voice synthesizing unit;
    a digital to analog conversion unit for converting a digital signal output from said voice synthesizing unit into an analog signal;
    an amplifying unit for amplifying the analog signal output from said digital to analog conversion unit; and
    a speaker for outputting the amplified audio signal output from said amplifying unit.

6. A device according to claim 1, wherein said timer measures a waiting time from a display of a key-input-waiting state to a performing of a key input operation.

7. A device according to claim 1, wherein said memory and said storing means comprise two different elements of said device.

8. A device according to claim 7, wherein said storing means comprises a random access memory for storing said data representing the plurality of time limits associated with the voice instructions, and wherein said memory comprises a random access memory.

9. A device comprising:
    storage means for storing information comprising a plurality of vocal messages to be output relating to a sequence of key input operations and information on a plurality of time limits associated with vocal messages, wherein one of said plurality of time limits is associated with each message;
    measuring means for measuring a waiting time for a next key input of the sequence of key input operations;

detection means for detecting whether the waiting time measured by said measuring means surpasses a stored time limit associated with a particular vocal message; and output means for outputting the particular vocal message relating to the next key input operation in response to a detection by said detection means that the waiting time for the next key input operation measured by said measuring means surpasses the time limit associated with the particular vocal message.

10. A device according to claim 9, wherein said storage means comprises two storage means, one for storing said information comprising said plurality of messages and another for storing said information on the time limit associated with each message.

11. A device according to claim 10, wherein said storage means comprises a random access memory for storing said information on the time limit associated with each message, and a voice data storage unit for storing the plurality of messages.

12. A device according to claim 9 wherein said measuring means comprises a timer and said detection means comprises a central processing unit.

13. A device according to claim 9, wherein said measuring means measures a waiting time from a display of a key-input-waiting state to a performing of a key input operation.

14. A device according to claim 9, wherein said detection means comprises a processor.

15. A device according to claim 14, wherein said processor comprises a central processing unit.

16. A device according to claim 9, wherein said output means comprises voice processing circuitry.

17. A device according to claim 16, wherein said voice processing circuitry comprises:

a voice synthesizing unit;

a digital to analog conversion unit for converting a digital signal output from said voice synthesizing unit into an analog signal;

an amplifying unit for amplifying the analog signal output from said digital to analog conversion unit; and a speaker for outputting the amplified audio signal output from said amplifying unit.

18. A voice output method comprising the steps of:

storing data representing voice instructions relating to a sequence of key input operations;

storing data representing a plurality of time limits associated with the voice instructions;

setting a plurality of time limits associated with the voice instructions and storing data representing the set time limits;

measuring a waiting time for a next key input operation of the sequence of key input operations;

detecting whether the waiting time measured in said measuring step surpasses a stored time limit associated with a particular voice instruction; and outputting the particular voice instruction relating to the next key input operation in response to a detection by said detection means that the waiting time of the next key input operation surpasses the set time limit associated with the particular voice instruction.

19. A voice output method according to claim 18, wherein said setting step is performed with a processor.

20. A voice output method according to claim 19, wherein said processor comprises a central processing unit.

21. A voice output method according to claim 18, wherein said outputting step is performed with voice processing circuitry.

22. A voice output method according to claim 21, wherein said outputting step further comprises the steps of outputting a digital signal from a voice synthesizing unit, converting the digital signal output from the voice synthesizing unit into an analog signal, amplifying the analog signal, and outputting the amplified analog signal.

23. A voice output method according to claim 18, wherein said two storing steps are performed by two different storage means.

24. The voice output method recited by claim 23, wherein said storing steps are performed by a random access memory.

25. The voice output method recited by claim 18, wherein said measuring step comprises the step of measuring a waiting time from a display of a key-input-waiting state to performing a key input operation.

26. A method comprising the steps of:

storing information comprising a plurality of vocal messages to be output relating to a sequence of key input operations and information on a plurality of time limits associated with vocal messages relating to the next key input operations, wherein one of said plurality of time limits is associated with each message;

measuring a waiting time for a next key input of the sequence of key input operations;

detecting whether the waiting time measured by said measuring means surpasses a stored time limit associated with a particular vocal message; and outputting the particular vocal message relating to the next key input operation in response to a detection in said detecting step that the waiting time for the next key input operation measured in said measuring step surpasses the time limit associated with the particular vocal message.

27. The method recited by claim 26, wherein said storing step is performed by two storage means, one for storing the information comprising the plurality of messages and the other for storing the information on the time limit associated with each message.

28. The method recited by claim 27, wherein said storing step is performed by a random access memory for storing the information on the time limit associated with each message and by a voice data storage unit for storing the plurality of messages.

29. The method recited by claim 26, wherein said measuring step is performed by a timer and said detecting step is performed by a central processing unit.

30. A method according to claim 26, wherein said measuring step comprises the step of measuring a waiting time from a display of a key-input-waiting state to the performing of a key input operation.

31. A method according to claim 26, wherein said outputting step is performed by voice processing circuitry.

32. A method according to claim 26, wherein said detecting step is performed by a processor.

33. A method according to claim 32, wherein said processor comprises a central processing unit.

34. A method according to claim 33, wherein said outputting step comprises the steps of generating a digital signal with a voice synthesizing unit, converting the digital signal into an analog signal, amplifying the analog signal, and outputting the amplified analog signal.

* * * * *

UNITED STATES PATENT AND TRADEMARK OFFICE
CERTIFICATE OF CORRECTION

PATENT NO. : 5,592,583    Page 1 of 2
DATED : January 7, 1997
INVENTOR(S) : ATSUSHI SAKURAI It is certified that error appears in the above-indentified patent and that said Letters Patent is hereby corrected as shown below:

COLUMN 2:

Line 19, "message," should read --message.--.

COLUMN 4:

Line 34, "Lime limit" should read --time limit.--.

COLUMN 5:

Line 29, "Lime" should read --time--.

COLUMN 6:

Line 14, "operation" should read --operations--.

UNITED STATES PATENT AND TRADEMARK OFFICE
CERTIFICATE OF CORRECTION

PATENT NO. : 5,592,583  
DATED : January 7, 1997  
INVENTOR(S) : ATSUSHI SAKURAI It is certified that error appears in the above-indentified patent and that said Letters Patent is hereby corrected as shown below:

COLUMN 8:

Line 31, "claim 1" should read --claim 1,--.

Line 33, "claim 2" should read --claim 2,--.

Line 35, "claim 1" should read --claim 1,--.

Line 37, "claim 4" should read --claim 4,--.

COLUMN 9:

Line 21, "claim 9" should read --claim 9,--.

Signed and Sealed this

Twenty-fourth Day of June, 1997

Attest:

BRUCE LEHMAN

*Attesting Officer*     *Commissioner of Patents and Trademarks*